United States Patent Office 3,565,871
Patented Feb. 23, 1971

3,565,871
COPOLYMERS OF ETHYLENE AND N-VINYL-
AZETIDINONES AND PROCESS FOR PRE-
PARING THEM
Herbert Bestian, Frankfurt am Main, Eduard Kaiser,
Kelkheim, Taunus, and Horst Schnabel, Hofheim,
Taunus, Germany, assignors to Farbwerke Hoechst Ak-
tiengesellschaft vormals Meister Lucius & Bruning,
Frankfurt am Main, Germany, a corporation of Ger-
many
No Drawing. Filed Oct. 28, 1968, Ser. No. 771,293
Claims priority, application Germany, Nov. 4, 1967,
P 17 20 745.3
Int. Cl. G08f 19/00
U.S. Cl. 260—20.72   6 Claims

ABSTRACT OF THE DISCLOSURE

The invention provides copolymers consisting of structural units of ethylene, N-vinylazetidin-2-ones and optionally vinyl acetate or acryl esters and a process for their manufacture. Depending on the ethylene pressure applied brittle hard, rubber-elastic or waxy and plastic products are obtained which may be used as dispersion and emulsion auxiliaries, for the manufacture of rubbers, or as thermoplastic adhesive.

The present invention relates to ethylene copolymers and to a process for preparing them.

The copolymerization of two or more monomers is an important method for making polymers having valuable properties. Ethylene has been copolymerized with numerous ethylenically unsaturated compounds. The reactivity of ethylene and of most of the monomers does not permit, or permits with difficulties only, the manufacture of copolymers of any composition. Vinyl acetate is one of the few monomers capable of being copolymerized with ethylene to give copolymers of any composition. A behavior similar to that of vinyl acetate in this respect show N-vinyl derivatives of at least five-membered lactams. The copolymerization under the action of free radical liberating catalysts of compounds of this kind with ethylene has been described in French Patent 1,392,354.

The present invention provides copolymers composed of $\pm$CH$_2$—CH$_2\pm$ structural units and structural units of the formula

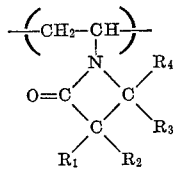

in which $R_1$–$R_4$ each present hydrogen or alkyl, alkenyl or phenyl radicals, and optionally

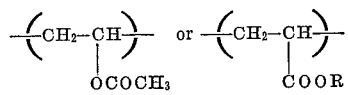

units, R being a hydrocarbon radical with 1 to 10 carbon atoms.

The present invention also provides a process for the manufacture of copolymers of ethylene and N-vinyl-lactams and optionally vinyl acetate or an acryl ester as third monomer by copolymerizing the monomers under the action of a free radical liberating catalyst at elevated pressure which comprises using as N-vinyllactams N-vinylazetidin-2-ones of the general formula

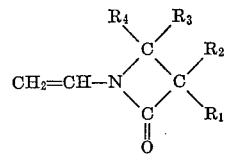

in which $R_1$–$R_4$ each represent hydrogen or alkyl, alkenyl or phenyl radicals.

It is advantageous to use in the process of the invention N-vinylazetidin-2-ones of the above formula in which one or two of the radicals $R_1$ to $R_4$ stand for identical or different alkyl groups having 1 to 4 carbon atoms, preferably methyl, and the other radicals R mean hydrogen.

Suitable acryl esters to be used are especially those in which the alcohol component derives from a hydrocarbon radical with 1 to 10 carbon atoms, for example methyl-, ethyl-, n-butyl-, n-hexyl- 2-ethylhexyl-, or octyl-acrylate.

The copolymers are produced in an autoclave in discontinuous or continuous operation at elevated pressure and in the presence of compounds forming free radicals, preferably in the presence of a solvent or diluent. The range of pressure under which ethylene and the N-vinyl-acetidinones can be copolymerized is very large and lies between 2 and 2,000 atmospheres. The pressure to be applied in each case depends on the desired properties of the copolymers. The composition of the copolymers is determined by the proportion of the monomers. The concentration of ethylene is directly proportional to the pressure. With a given concentration of N-vinylazetidinone and a given temperature, the composition of the copolymer is thus a function of pressure. When, for example, a benzenic solution of 25% by weight of N-vinylazetidinone is first introduced into the autoclave and ethylene is forced in under a pressure of 2 to 100 atmospheres, products are obtained containing less than 10% by weight of ethylene. Under the same conditions products having an ethylene content below 70% by weight are obtained under an ethylene pressure of 100 to 500 atmospheres and products having an ethylene content of more than 50% by weight are obtained under a pressure above 500 atmospheres.

The copolymers according to the invention preferably contain 8 to 96% by weight of ethylene.

The copolymerization is carried out in bulk and preferably in the presence of solvents or diluents as solution or precipitation polymerization and as emulsion or dispersion polymerization. Suitable solvents and diluents are, in the first place, aliphatic and aromatic hydrocarbons, for example hexane, benzene, toluene, lower alcohols such as methanol and tertiary butanol, and water as well as mixtures of water and alcohol.

The copolymerization is preferably carried out at a temperature in the range of from 30° C. to 250° C. The temperature to be chosen depends essentially on the desired properties of the copolymer. Copolymers containing a high proportion of N-vinyl-azetidinone are obtained best at a temperature in the range of from 50 to 120° C., whereas copolymers with high content of ethylene are suitably produced at a temperature above 120° C., preferably 170 to 220° C., and under a pressure above 1,000 atmospheres. To produce waxy products the copolymerization is carried out under a pressure of from 500 to 1,000 atmospheres, preferably at a temperature of from 120 to 190° C.

To initiate the copolymerization the usual catalysts for free radical initiated polymerizations are used, namely peroxides, acyl peroxides, per-esters, hydroperoxides, aliphatic azo compounds and persulfates. Especially suitable are peroxides, for example di-tert-butyl peroxide, azocompounds, for example azobisisobutyronitrile, and persulfates, such as ammonium persulfate.

The monomeric N-vinyl-lactams can be prepared by the process described in Belgian Patent 688,243, by treating N-($\alpha$-alkoxyalkyl)-azetidin-2-ones with acid catalysts at elevated temperature.

Compared with at least five-membered lactams, the homologous four-membered $\beta$-lactams are much more reactive owing to the considerable ring tension. At higher temperatures they strongly tend to polymerize with ring opening or to decompose with formation of isocyanate and olefin (cf. Houben-Weyl, volume XI/2, page 528). It was, therefore, surprising that N-vinyl-$\beta$-lactams copolymerize with ethlene under the action of free radical liberating catalysts with preservation of the $\beta$-lactam ring and as clearly results from the short wave carbonyl band in the infrared spectrum at 5.7–5.8$\mu$. The novel copolymers of the invention differ from known copolymers of ethylene and at least five-membered N-vinyl-lactams in the situation of the carbonyl absorption which is at 5.9–6.0$\mu$ for the known compounds. The novel copolymers are furthermore distinguished by their high reactivity. Comparative experiments revealed that the acid hydrolysis, acid alcoholysis and aminolysis of the copoly (ethylene-N-vinylazetidinones) were faster by at least two orders of magnitude than the corresponding reactions of copoly (ethylene-N-vinylpyrrolidones). Hence, it follows that the copolymers of the invention can be reacted rapidly and completely under mild and economic conditions under which copolymers of ethylene and N-vinylpyrrolidone do not react. As the speed of hydrolysis of five-, six-, and seven-membered polyvinyllactams is independent of the number of ring members (cf. Sowj. Beitr. Faserforschung Textiltechnik, volume 3, (1966) page 453), the reactivity of the copolymers of the invention constitutes a novel and valuable property.

Copolymers having an ethylene content of less than 40 mol percent are brittle, hard substances the softening points of which decrease from 160° C. to 40° C. with increasing proportion of ethylene. They are soluble at room temperature in methanol, chloroform and water. Copolymers containing 50 to 85 mol percent ethylene have a softening point below 20° C.; according to their molecular weight they are viscous plastic or rubber elastic at room temperature and dissolve at room temperature in chloroform and toluene. Copolymers containing more than 90 mol percent of ethylene are waxy or plastic-like, tough substances with a softening point above 40° C. With an increasing proportion of ethylene the softening point rises to about 100° C. while simultaneously the range of rubber-elasticity diminishes. The latter copolymers are insoluble at 20° C. in organic solvents, but soluble in toluene or chloroform at higher temperatures and the turbidity point rises with increasing proportion of ethylene. The described melting and dissolution properties indicate the presence of crystalline ranges the proportion of which increases with growing content of ethylene.

The copolymers of the invention are used as dispersing and emulsifying auxiliaries, for the manufacture of rubber, as thermoplastic adhesive and as additives to thermoplastic adhesive compositions.

The following examples serve to illustrate the invention but they are not intended to limit it thereto, the parts being by weight unless otherwise stated.

EXAMPLES 1–6

A high pressure autoclave with magnetic stirrer was scavenged twice with ethylene. By means of a high pressure dosing pump 300 parts of solvent (as specified in Table 1), 100 parts of N-vinyl-4-methylazetidin-2-one and 1 part of azobisisobutyronitrile were pumped in. The autoclave was heated at 75° C. and ethylene was forced in until the desired pressure was reached. The contents of the autoclave were withdrawn after 5 hours through an ascending tube. The dissolved or strongly swollen copolymers were precipitated with low boiling petroleum ether, filtered, washed with petroleum ether and dried in a rotary evaporator under reduced pressure.

TABLE 1

| | Solvent proportion, by volume | Ethylene pressure, atm. gauge | Yield, parts by weight |
|---|---|---|---|
| Example No.: | | | |
| 1 | Benzene/toluene, 4:1 | 20 | 73.0 |
| 2 | do | 200 | 45.0 |
| 3 | do | 300 | 50.0 |
| 4 | do | 400 | 60.0 |
| 5 | Methanol | 550 | 70.0 |
| 6 | Tert.-butanol | 500 | 46.0 |

EXAMPLES 7–10

A high pressure autoclave with magnetic stirrer was scavenged twice with ethylene. By means of a high pressure dosing pump 200 parts by volume of a solution of varying amounts of N-vinyl-4-methylazetidin-2-one in benzene were rapidly pumped in at a temperature of from 140° C. to 200° C. Next, ethylene was forced in until a pressure of 500 atmospheres gauge was reached. Within the course of about 1 hour a solution of 1 part of initiator in 100 parts by volume of a mixture 4:1 of benzene and toluene was pumped in while the pressure was maintained at 500 atmospheres gauge. The contents of the autoclave were withdrawn through an ascending tube, transferred to a suction filter, the copolymer was washed with benzene and dried in a rotary evaporator under reduced pressure.

TABLE 2

| | N-vinyl-N-methyl-azetidi-none-2, parts by weight | Initiator | Polymerization temperature, °C. | Polymerization time, hour | Yield, parts by weight |
|---|---|---|---|---|---|
| Example No.: | | | | | |
| 7 | 10.0 | BPO | 140 | 1.5 | 113 |
| 8 | 50.0 | AJBN | 135 | 1.0 | 162 |
| 9 | 100.0 | AJBN | 140 | 1.5 | 165 |
| 10 | 100.0 | DTBPO | 170 | 1.0 | 200 |

NOTE: BPO=benzoyl peroxide. AJBN=azobisisobutyronitrile. DTBPO=di-tert-butyl peroxide.

EXAMPLES 11–13

A high pressure autoclave with magnetic stirrer was scavenged twice with ethylene. At 140° C., 100 parts by volume of benzene were pumped in and ethylene was forced in until a pressure of 600 atmospheres gauge was reached. Within the course of approximately one hour 200 parts by volume of a solution of 1 part of azobisisobutyronitrile and varying amounts of N-vinyl-4-methylazetidin-2-one in a 4:1 mixture of benzene and toluene were pumped in by means of a high pressure dosing pump, the ethylene pressure being maintained by additionally forcing in ethylene. The autoclave was emptied with the aid of an ascending tube, the copolymer was transferred to a suction filter, washed with methanol and dried in a rotary evaporator under reduced pressure.

TABLE 3

| | N-vinyl-4-methyl-azetidin-2-one, parts by weight | polymerization time, hour | Yield, parts by weight |
|---|---|---|---|
| Example No.: | | | |
| 11 | 10.0 | 1.0 | 175 |
| 12 | 50.0 | 1.0 | 178 |
| 13 | 100.0 | 0.45 | 215 |

EXAMPLES 14–15

By the method described in Example 12, N-vinyl-3,4-dimethylazetidin-2-one (Example 14) and N-vinyl-4,4-dimethylazetidin-2-one (Example 15) were copolymerized with ethylene. 130 and 114 parts, respectively, of copolymer were obtained.

EXAMPLE 16

A high pressure autoclave with magnetic stirrer was scavenged twice with ethylene and then charged with a solution of 2 parts of potassium paraffin sulfonate, 20 parts of N-vinyl-4-methyl-azetidinone and 200 parts of water. The mixture was heated at 100° C. and ethylene was forced in until a pressure of 400 atmospheres gauge was reached. Within the course of one hour a solution of 1 part of azobisisobutyronitrile, 50 parts of N-vinyl-4-methyl-azetidinone and 50 parts of water were pumped in. After a further two hours at 100° C. under a pressure of 400 atmospheres gauge the contents of the autoclave were withdrawn with an ascending tube. 55 parts of copolymer were obtained.

EXAMPLE 17

A high pressure autoclave with magnetic stirrer was scavenged twice with ethylene. At 140° C., 200 parts by volume of a solution of 50 parts of N-vinyl-4-methyl-azetidin-2-one and 50 parts of vinyl acetate in benzene were rapidly pumped in. Ethylene was introduced until a pressure of 500 atmospheres gauge was reached. Within the course of approximately one hour a solution of 1 part of azobisisobutyronitrile in 100 parts by volume of a 4:1 mixture of benzene and toluene was pumped in while the pressure was maintained at 500 atmospheres by adding ethylene. The contents of the autoclave were withdrawn through an ascending tube, transferred to a suction filter, the copolymer was washed with petroleum ether and dried in a rotary evaporator under reduced pressure. 178 parts of copolymer were obtained.

EXAMPLE 18

A high pressure autoclave with magnetic stirrer was scavenged twice with ethylene. At 140° C., 200 parts by volume of a solution of 40 parts of N-vinyl-4-methyl-azetidin-2-one and 40 parts of acrylic acid methyl ester in benzene were rapidly pumped in. Ethylene was forced in until a pressure of 500 atmospheres was reached. Within the course of one hour a solution of 1 part of azobisisobutyronitrile in 100 parts by volume of a 4:1 mixture of benzene and toluene was pumped in while the pressure was maintained at 500 atmospheres by additionally forcing in ethylene. The contents of the autoclave were withdrawn with an ascending tube, transferred to a suction filter, the copolymer was washed with methanol and dried in a rotary evaporator under reduced pressure. 140 parts of copolymer were obtained.

Characterization of the products of the invention

The following values were obtained with samples of the products which had been purified by double dissolution and precipitation in chloroform/ether and toluene/acetone, respectively, and dried until their weight remained constant.

The specific viscosity $\eta_{spec}$ was determined in an Ubbelohde capillary viscometer with a 1% solution of the copolymer in xylene at 85° C.

The density was measured by the suspension method.

To determine the turbidity point 1 gram of substance was dissolved in 10 cc. of warm toluene to give a clear solution, the solution was cooled and the temperature determined at which turbidity occurred.

TABLE 4

| Example No. | Elemental analysis, percent C | Elemental analysis, percent N | β-lactam content in copolymer, percent by weight | η spec./C., dl./gram. | density, gram./ml. | Turbidity point in toluene, ° C. |
|---|---|---|---|---|---|---|
| 1 | 66.6 | 11.7 | 92.1 | [1] 0.153 | | |
| 2 | 70.4 | 9.2 | 73.0 | 0.103 | | |
| 3 | 72.4 | 8.45 | 67.1 | 0.156 | | |
| 4 | 73.2 | 7.4 | 58.6 | 0.159 | | |
| 5 | 74.4 | 7.25 | 57.4 | 0.250 | | |
| 6 | 77.5 | 5.4 | 42.8 | 0.516 | | |
| 7 | 83.6 | 1.35 | 10.7 | 0.521 | 0.912 | 68 |
| 8 | 81.4 | 2.5 | 19.8 | 0.385 | 0.927 | 55 |
| 9 | 76.2 | 4.1 | 32.6 | 0.295 | 0.940 | 40 |
| 10 | 78.5 | 4.8 | 38.0 | 0.420 | 0.940 | |
| 11 | 85.0 | 0.57 | 4.5 | 0.590 | 0.912 | 70 |
| 12 | 81.9 | 2.3 | 18.3 | 0.390 | 0.926 | 55 |
| 13 | 80.0 | 3.5 | 29.0 | 0.415 | 0.930 | |
| 14 | 82.1 | 2.4 | 21.0 | 0.393 | 0.920 | 65 |
| 15 | 81.8 | 2.5 | 22.8 | 0.390 | 0.921 | 58 |
| 16 | 75.7 | 6.0 | 42.0 | 0.187 | 0.960 | |
| 17 | 80.0 | 1.95 | [2] 15.5 | 0.454 | | |
| 18 | 78.0 | 2.1 | [3] 17.0 | 0.359 | | |

[1] Methanol 50°.
[2] Additionally containing 10.0% by weight of vinyl acetate structural units.
[3] Additionally containing 13.0% by weight of acrylic acid methyl ester structural units.

5 grams each of the following polymers or copolymers, respectively, were heated for 20 hours with reflux together with 20 milliliters of 20% HCl:

(a) poly-N-vinylpyrrolidone (Luwiskol K 30®)

$$\eta_{spec/c.} = 0.210$$

(1% solution in water at 25°)

(b) poly-N-vinyl-4-methylazetidin-2-one $\eta_{spec/c.} = 0.286$
(1% solution in water at 25° C.)

(c) copoly(ethylene-N-vinylpyrrolidone) C=75.8%; H=11.9%; N=5.7%; 45.2% by weight of vinylpyrrolidone in copolymer, $\eta_{spec/c.} = 0.260$ dl./g. (1% solution in xylene at 85° C.)

(d) copoly(ethylene-N-vinyl-4-methylazetidin-2-one) (according to invention) characterization cf. Example 9.

Products (a) and (b) were precipitated in acetone, dissolved in 50 milliliters of $H_2O$, dialyzed in a dialyzer with water until the reaction was neutral, the solution was concentrated and the polymer was freeze dried. The composition of the product was determined by infrared spectrum and elemental analysis.

(a) The infrared spectrum was identical with that of the starting product. In the elemental analysis was found C=63%, H=8.3%, N=12.9%, Cl=1.0%. Calculation for polyvinylpyrrolidone gave C=64.8%, H=8.1%, N=12.6%. Hydrolysis did not take place or to a very little extent only, the staring product was recovered practically unchanged.

(b) Compared with the starting product the infrared spectrum showed considerable differences. A strong new band at 1590 cm.$^{-1}$, a medium absorption range at 2860–2400 cm.$^{-1}$ and a very weak band at 1720 cm.$^{-1}$ indicated the presence of the following structural units:

```
+CH₂—CH+           (I)      (I) and +CH₂—CH+        (II)
       |                                   |
      NH₂⊕                                NH₂⁺ Cl⁻
       |                                   |
   CH₃—CH—CH₂—CO₂⁻                    CH₃—CH—CH₂—CO₂H
```

Found: C=52.3%, H=8.7%, N=10.6%, Cl=4.1%. Calculated for a mixture consisting of 80% of structural units of Formula I and 20% of structural units of Formula II C=53.3%, H=8.3%, N=10.4%, Cl=4.3%.

Products (c) and (d) were repeatedly treated with 50 milliliters of hot water each time until the reaction was neutral, dehydrated with acetone and dried over sulfuric acid at 60° C. under 2 mm. of mercury.

(c) The infrared spectrum was identical with that of the starting product. There were found C=76.1%, H=12.0%, N=5.9%, Cl=0.7%. Hydrolysis did not take place or to a very small extent only. The starting product was recovered practically unchanged.

(d) In the infrared spectrum a medium band additionally appeared at 1590 cm.$^{-1}$. There were found C=67.2%, H=11.4%, N=3.35%, Cl=8.7%. For a complete hydrolysis of the lactam portion of a copolymer containing 42% by weight of structural units of Formula II and 58% by weight of ethylene there were calculated C=67.9%, H=11.5%, N=3.55%, Cl=9.4%.

5 grams each of the polymers defined in items (a) to (d) were heated for 4 hours with reflux with 20 milliliters of 5 molar ethanolic hydrochloric acid. The reaction mixtures were worked up and the products purified as described in Example 18.

(a) The infrared spectrum was identical with that of the starting product. There were found C=62.7%, H=8.5%, N=12.3%, Cl<0.3%. Calculated for polyvinylpyrrolidone C=64.8%, H=8.1%, N=12.6%. An ethanolysis did not take place or to a very little extent only. The starting product was recovered practically unchanged.

(b) Compared with the starting compound the infrared spectrum indicated the presence of the following structural unit by intensive bands at 2650, 2430, 1580 and 1196 cm.$^{-1}$

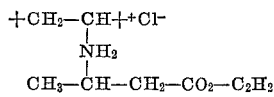

There were found C=48.5%, H=8.2%, N=7.4%, Cl=18.2%. A calculation with the assumption that complete ethanolysis had taken place gave the following results C=49.6%, H=8.3%, N=7.2%, Cl=18.4%.

(c) The infrared spectrum was identical with that of the starting product. There were found C=76.1%, H=12.0%, N=5.9%, Cl=0.7%. An ethanolysis did not take place or to a very small extent only. The starting product was recovered practically unchanged.

(d) Compared with the starting substance the infrared spectrum showed the same new bands as (b). There were found C=68.5%, H=11.6%, N=3.5%, Cl=8.3%. A calculation with the assumption that complete ethanolysis of the β-lactam portion had taken place gave the following results C=69.4%, H=11.6%, N=3.25%, Cl=8.2%. The product obtained was soluble in water.

The above investigations indicate that product (d) according to the invention hydrolyzes under very mild conditions under which known products (a) and (c) are not reactive.

What is claimed is:
1. Copolymers consisting essentially of $+CH_2-CH_2+$ structural units, structural units of the following formula

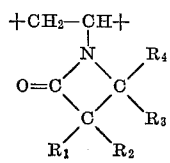

in which $R_1$ to $R_4$ each represent hydrogen or alkyl, alkenyl or phenyl radicals, and structural units of formula

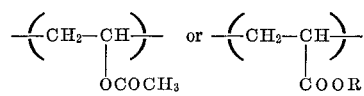

in which R stands for a hydrocarbon radical with 1 to 10 carbon atoms.

2. Copolymers consisting essentially of $+CH_2-CH_2+$ structural units and structural units of the following formula

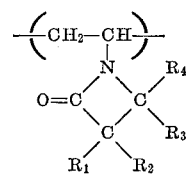

in which $R_1$ to $R_4$ each represent hydrogen or alkyl, alkenyl, or phenyl radicals.

3. Copolymers as claimed in claim 2, wherein the formula of the N-vinylazetidin-2-one structural units one or two of the radicals $R_1$ to $R_4$ represent identical or different alkyl radicals with 1 to 4 carbon atoms and the other radicals R stand for hydrogen.

4. Copolymers as claimed in claim 3, wherein the alkyl radicals are methyl.

5. Copolymers as claimed in claim 2, containing 8 to 96% by weight of $+CH_2-CH_2+$ structural units.

6. A terpolymer consisting essentially of structural units derived from the monomers (a) ethylene, (b) vinyl acetate or an acrylic acid ester and (c) an N-vinylazetidinone of the general formula

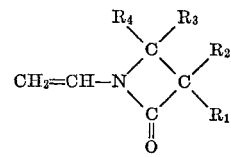

in which $R_1$ to $R_4$ each stand for hydrogen or alkyl, alkenyl or phenyl radicals, said monomers being copolymerized through the ethylenic groups thereof.

References Cited

UNITED STATES PATENTS 3,296,231  1/1967  Resz et al. _____ 260—88.1

JOSEPH L. SCHOFER, Primary Examiner

S. M. LEVIN, Assistant Examiner

U.S. Cl. X.R.

260—88.1, 88.3